US011079482B2

(12) United States Patent
Xiong et al.

(10) Patent No.: US 11,079,482 B2
(45) Date of Patent: Aug. 3, 2021

(54) PRESENCE DETECTION SYSTEM

(71) Applicant: Carrier Corporation, Farmington, CT (US)

(72) Inventors: Ziyou Xiong, Wethersfield, CT (US); Cagatay Tokgoz, South Windsor, CT (US); Joseph Zacchio, Wethersfield, CT (US); Nicholas Charles Soldner, Southbury, CT (US); Joseph V. Mantese, Ellington, CT (US); Alan Matthew Finn, Hebron, CT (US); Mathias Pantus, Brunssum (NL); Jeroen te Paske, Roggel (NL); Pascal van de Mortel, Mierlo (NL)

(73) Assignee: CARRIER CORPORATION, Palm Beach Gardens, FL (US)

( * ) Notice: Subject to any disclaimer, the term of this patent is extended or adjusted under 35 U.S.C. 154(b) by 223 days.

(21) Appl. No.: 16/077,340

(22) PCT Filed: Feb. 6, 2017

(86) PCT No.: PCT/US2017/016649
§ 371 (c)(1),
(2) Date: Aug. 10, 2018

(87) PCT Pub. No.: WO2017/139215
PCT Pub. Date: Aug. 17, 2017

(65) Prior Publication Data
US 2019/0049570 A1 Feb. 14, 2019

Related U.S. Application Data
(60) Provisional application No. 62/293,541, filed on Feb. 10, 2016.

(51) Int. Cl.
G01S 13/56 (2006.01)
G01S 7/41 (2006.01)
(Continued)

(52) U.S. Cl.
CPC .............. *G01S 13/56* (2013.01); *G01S 7/415* (2013.01); *G01S 13/34* (2013.01); *G01S 13/867* (2013.01);
(Continued)

(58) Field of Classification Search
CPC combination set(s) only.
See application file for complete search history.

(56) References Cited

U.S. PATENT DOCUMENTS 5,517,429 A   5/1996  Harrison
6,190,377 B1* 2/2001  Kuzdrall .............. A61B 18/203
                                              606/10
(Continued)

FOREIGN PATENT DOCUMENTS

CN    102798473 A   11/2012
CN    203568607 U    4/2014
(Continued)

OTHER PUBLICATIONS

ISR/WO, dated May 19, 2017, 12 pages.

Primary Examiner — Mamadou L Diallo
(74) Attorney, Agent, or Firm — Cantor Colburn LLP

(57) ABSTRACT

A presence detection system includes an infrared detector and a radar detector. A computer processor of the system is configured to receive respective signals from the infrared and radar detectors and process the signals via execution of an algorithm.

11 Claims, 6 Drawing Sheets

(51) Int. Cl.
  *G01S 13/86* (2006.01)
  *G01S 13/88* (2006.01)
  *G01S 13/34* (2006.01)
  *G08B 13/19* (2006.01)
  *G08B 25/14* (2006.01)
  *G08B 21/22* (2006.01)

(52) U.S. Cl.
  CPC ............ *G01S 13/886* (2013.01); *G08B 13/19* (2013.01); *G08B 21/22* (2013.01); *G08B 25/14* (2013.01)

(56) References Cited

U.S. PATENT DOCUMENTS

| | | | |
|---|---|---|---|
| 6,313,743 | B1 | 11/2001 | Abraham-Fuchs et al. |
| 6,343,534 | B1 | 2/2002 | Khanna et al. |
| 6,351,234 | B1 | 2/2002 | Choy |
| 6,439,162 | B1 | 8/2002 | Van Den Berg |
| 6,791,610 | B1 | 9/2004 | Butler et al. |
| 6,992,291 | B2 | 1/2006 | Porter et al. |
| 7,679,509 | B2 | 3/2010 | Royer |
| 7,807,010 | B2 | 10/2010 | Pitault |
| 7,811,234 | B2 | 10/2010 | McGrath |
| 7,842,922 | B2 | 11/2010 | Leneke et al. |
| 7,924,212 | B2 | 4/2011 | Benitez et al. |
| 8,026,842 | B2 | 9/2011 | Fox et al. |
| 8,102,261 | B2 | 1/2012 | Wu |
| 8,120,524 | B2 | 2/2012 | Zemany |
| 8,378,820 | B2 | 2/2013 | Micko |
| 8,615,420 | B2 | 12/2013 | Holliday |
| 8,731,241 | B2 | 5/2014 | Johnson et al. |
| 8,814,805 | B2 | 8/2014 | Lin et al. |
| 8,884,813 | B2 | 11/2014 | Bangera et al. |
| 10,247,818 | B2 * | 4/2019 | Hjelmstad ............ G01S 13/867 |
| 2003/0193429 | A1 * | 10/2003 | Campana ................ G01V 8/00 342/22 |
| 2012/0066168 | A1 | 3/2012 | Fadell et al. |
| 2012/0276849 | A1 | 11/2012 | Hyde et al. |
| 2012/0319819 | A1 * | 12/2012 | Tkachenko ........... G01S 13/878 340/10.1 |
| 2013/0002434 | A1 | 1/2013 | Cuddihy et al. |
| 2013/0135444 | A1 | 5/2013 | Stein et al. |
| 2014/0163343 | A1 | 6/2014 | Heneghan et al. |
| 2016/0266256 | A1 * | 9/2016 | Allen ................. G06K 9/00791 |
| 2017/0299710 | A1 * | 10/2017 | Shin ........................ G01S 17/04 |

FOREIGN PATENT DOCUMENTS

| | | |
|---|---|---|
| CN | 104484968 A | 4/2015 |
| CN | 204405190 U | 6/2015 |
| WO | 0137000 A2 | 5/2001 |

* cited by examiner

PRESENCE DETECTION SYSTEM

CROSS-REFERENCE TO RELATED APPLICATIONS

This application claims the benefit of PCT/US2017/016649 filed Feb. 6, 2017, which claims priority to U.S. Provisional Application No. 62/293,541 filed Feb. 10, 2016, which is incorporated herein by reference in its entirety.

BACKGROUND

The present disclosure relates to a presence detection system, and more particularly to a cooperative radar and infrared presence detection system.

Ensuring safety and efficient energy management in, for example, buildings, requires accurate counting of building occupants. In traditional occupancy counting applications a device may be used to quantify the number and direction of occupants traversing, for example, an entrance or exit point. The accuracy and resolution of such a device may depend on the employed technology. Different forms of technologies have been used in developing occupancy counting devices, such as a passive infrared sensor (PIR), a laser beam-break sensor, and a two-dimensional camera in the visible or thermal spectrum. Unfortunately, such known devices are high in cost, require considerable energy, are low in accuracy, have range limitations, and may lack the intelligence to verify that the target is indeed a human.

SUMMARY

A presence detection system according to one, non-limiting, embodiment of the present disclosure includes an infrared detector; a radar detector; and a computer processor configured to receive respective signals from the infrared and radar detectors and process the signals via execution of an algorithm.

Additionally to the foregoing embodiment, the algorithm is a sensor fusion algorithm.

In the alternative or additionally thereto, in the foregoing embodiment, the infrared detector includes a focal plane array including a plurality of radiant energy sensors configured to convert radiant energy into an electrical signal.

In the alternative or additionally thereto, in the foregoing embodiment, the radar detector includes at least one antenna and a switching module configured to steer the at least one antenna for presence detection.

In the alternative or additionally thereto, in the foregoing embodiment, the radar detector is configured to perform one of an initial presence detection and a presence confirmation, and the infrared detector is configured to perform the other of the initial presence detection and the presence confirmation.

In the alternative or additionally thereto, in the foregoing embodiment, the radar detector includes a quadrature mixer module configured to communicate with the switching module and the computer processor and output a down-mixed signal, a heartbeat/respiration detector configured to receive the down-mixed signal to distinguish vital signs of a detected presence, and a localization module configured to receive the down-mixed signal to localize the detected presence.

In the alternative or additionally thereto, in the foregoing embodiment, the radar detector includes a human presence module configured to receive an output signal from the heartbeat/respiration detector to determine if the detected presence is human.

In the alternative or additionally thereto, in the foregoing embodiment, the human presence module is configured to output an affirmative signal to a FMCW mode module of a controller that includes the computer processor, and wherein the FMCW mode module is configured to separate multiple detected presence in space to assist execution of the algorithm by the computer processor to selectively reject presence detections.

In the alternative or additionally thereto, in the foregoing embodiment, the human presence module is configured to output a negative signal to the controller if a human presence is not detected.

In the alternative or additionally thereto, in the foregoing embodiment, the infrared detector is configured to operate in a sleep mode upon the absence of motion.

In the alternative or additionally thereto, in the foregoing embodiment, the radar detector is configured to measure vital signs of a presence.

In the alternative or additionally thereto, in the foregoing embodiment, the vital signs include at least one of heartbeat and respiration.

A method of operating a presence detection system according to another, non-limiting, embodiment includes detecting a presence by an infrared detector at a location; steering an antenna of a radar detector toward the location; and measuring vital signs of the presence by a radar detector.

Additionally to the foregoing embodiment, a computer processor receives a signal from the infrared detector indicative of the presence and the location and outputs an associated signal to a switching module for further interrogation of the presence.

In the alternative or additionally thereto, in the foregoing embodiment, the computer processor executes a sensor fusion algorithm.

In the alternative or additionally thereto, in the foregoing embodiment, the infrared detector includes a Doppler mode of operation.

In the alternative or additionally thereto, in the foregoing embodiment, the infrared detector includes a FMCW mode of operation.

In the alternative or additionally thereto, in the foregoing embodiment, the radar detector is steered by the computer processor indicative of presence detection by the infrared detector.

In the alternative or additionally thereto, in the foregoing embodiment, the presence detection system is part of a building management system.

In the alternative or additionally thereto, in the foregoing embodiment, the method includes reverting the infrared detector to a sleep mode upon loss of motion by the presence; and continued interrogation by the radar detector of the presence.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
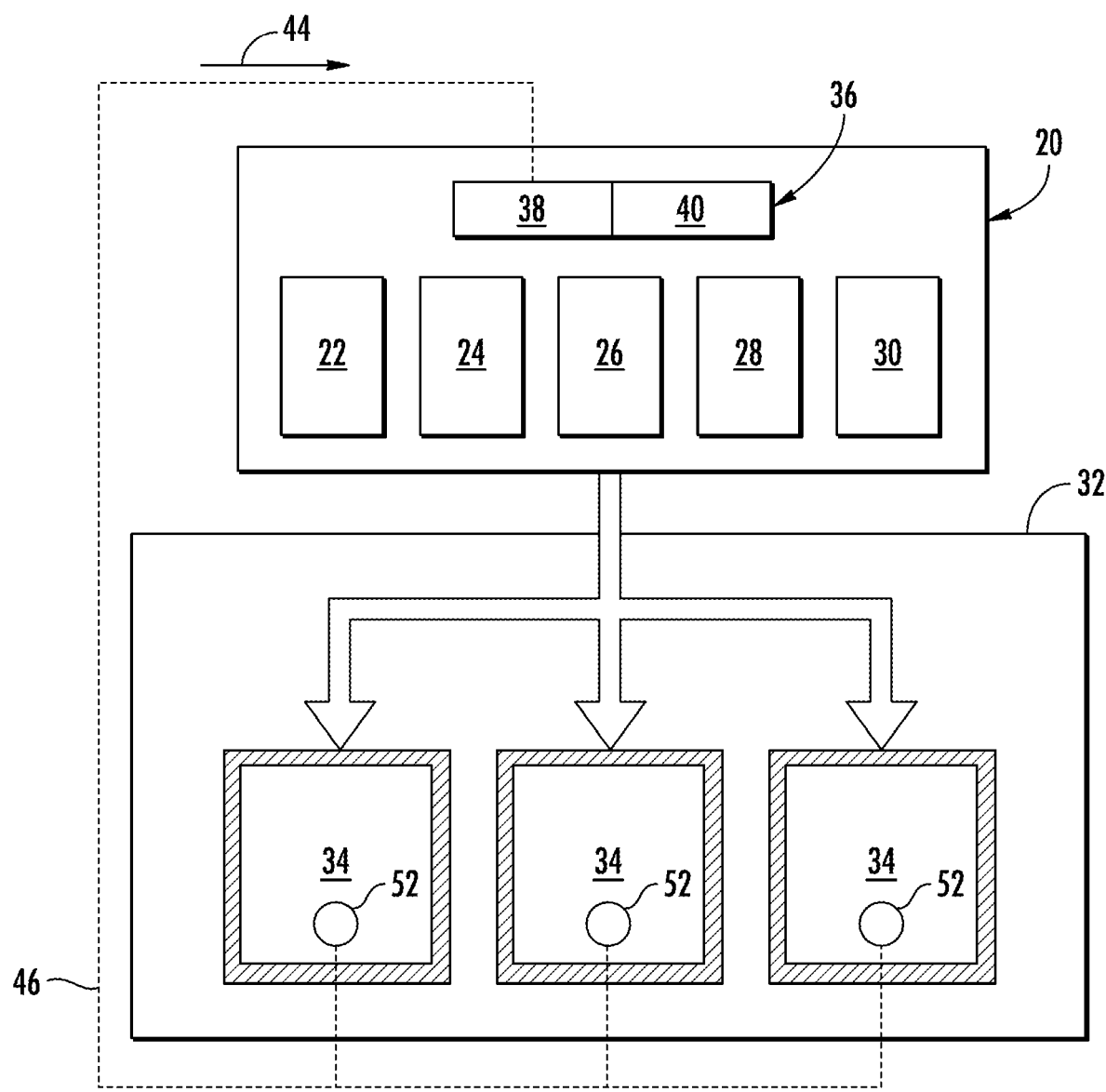
FIG. 1 is a schematic of a building management system utilizing a presence detection system of the present disclosure.

Referring to FIG. 1, a building management system 20 of the present disclosure is illustrated. The building management system 20 may include at least one of an ambient air temperature control system 22, a security system 24 (i.e., intrusion system), a lighting or illumination system 26, a transportation system 28 a safety system 30 and others. Each system 22, 24, 26, 28, 30 may be associated with and/or contained within a building 32 having a plurality of predefined spaces 34 that may generally be detached or substantially isolated from one-another, may be accessible and/or interconnected via a door and/or through hallways (not shown) and other means.

The ambient air temperature control system 22 may be a forced air system such as a heating, ventilation, and air conditioning (HVAC) system, a radiant heat system and others. The security system 24 may be configured to detect intruders and provide various forms of alerts and notifications. The lighting system 26 may control and/or monitor lighting in each one of the predefined spaces 34 based on any number of factors including natural background lighting, occupancy and others. The transportation system 28 may include the control and/or monitoring of elevators, escalators and other transportation devices associated with and/or within the building 32. The safety system 30 may include the detection of conditions that may pose a risk or health hazard to occupants of the building 32. All of these systems 22, 24, 26, 28, 30 may require a variety of devices to perform any variety of functions including detection, monitoring communication, data referencing and collection, user control and others. Many devices may be shared between systems.

The building management system 20 may further include a computing device 36 that controls and/or supports each system 22, 24, 26, 28, 30. The computing device 36 may include a processor 38 (e.g., microprocessor) and a computer readable and writeable storage medium 40. It is further contemplated and understood that the building management system 20 may include more than one computing device 36 with any one computing device being dedicated to any one of the systems 22, 24, 26, 28, 30. Computing device 36 may be implemented in a physically co-located, or in a physically distributed manner. The computing device need not be physically contained within the building 32.

The building management system 20 includes at least one presence detection system 42 (i.e., a presence detection system 42 designated for a space 34). The presence detection system 42 may utilize, in-part, low complexity, low cost and low resolution infrared sensors assisted by computer vision algorithms to accurately detect, classify, track and count a moving presence or occupants (e.g., humans) in a given space 34 using minimal energy consumption. In one embodiment, the presence detection system 42 may supplement functions of the building management system 20 (e.g., HVAC system 22, lighting system 26, security system 24 and others). For example, the computing device 36 may receive a signal (see arrow 44) over a wired or wireless pathway(s) 46 from the presence detection system 42 indicative of a number of intruders in a given space 34. Upon such a signal 44, the computing device 36 may output a command signal (not shown) to the security system 24 for initiating a security response that may be an alert, an alarm, and/or other initiations.

Figure 2:
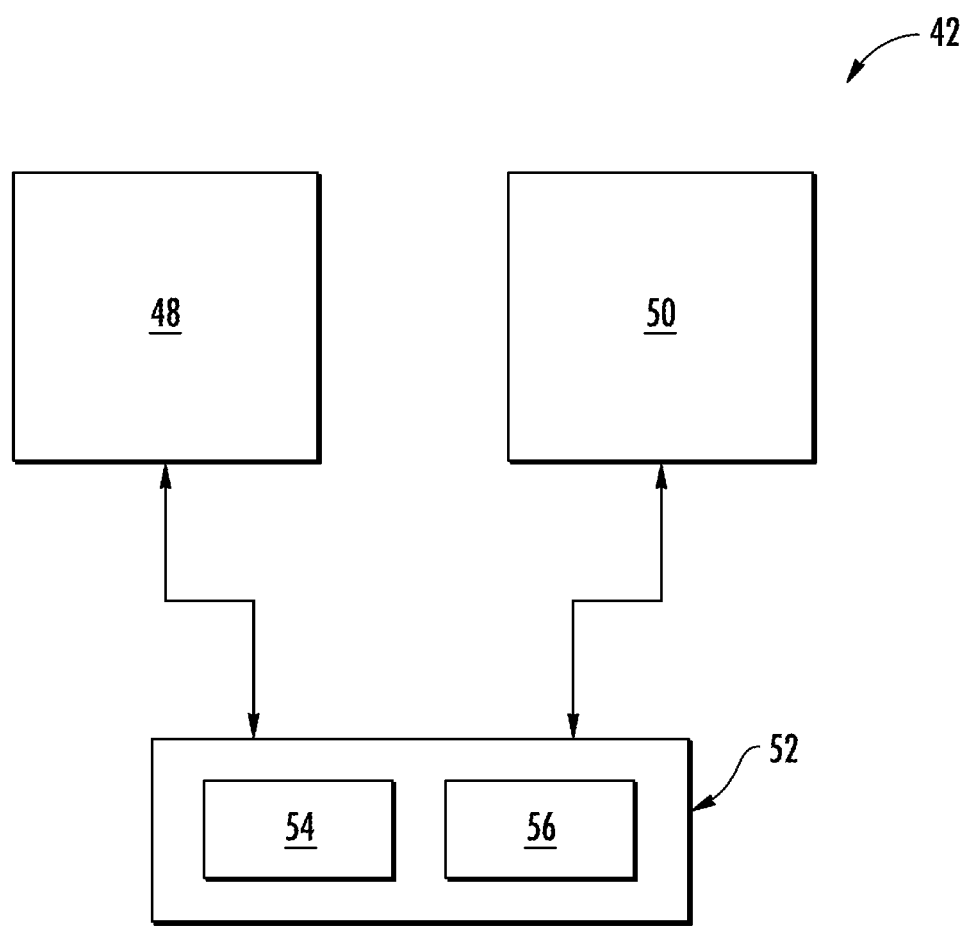
FIG. 2 is a basic block diagram of the presence detection system.

Referring to FIG. 2, the presence detection system 42 may include a radiant energy detector 48 (e.g., a pyroelectric detector, multi-pixel passive infrared detector, multi-pixel focal plane array, etc.), a radar detector 50 (e.g., electromagnetic field disturbance detector, Doppler-based radar transceiver, etc.), and a controller 52. The controller 52 may include a computer-based processor 54 (e.g., micro-processor) for communicating between the detectors 48, 50 and a computer readable and writeable storage medium 56. The controller 52 may be configured to communicate with the computing device 36. Alternatively, the computing device 36 may be the controller and thus configured to support and control the detectors 48, 50.

The infrared detector 48 may be configured to monitor substantially all of the designated space 34 for the detection of a presence that may be a living presence (e.g., a human). The detection function performed by the infrared detector 48 may include classification, tracking and counting of the presence. The detection function of performed by the infrared detector 48 is not limited to presence detection, but may also include safety and security functions. To monitor the entire space 34, the infrared detector 48 may be located in a top portion of the space 34 (e.g., mounted to a ceiling or corner mounted) and may be substantially centered to the top portion, or upon the ceiling.

Figure 3:
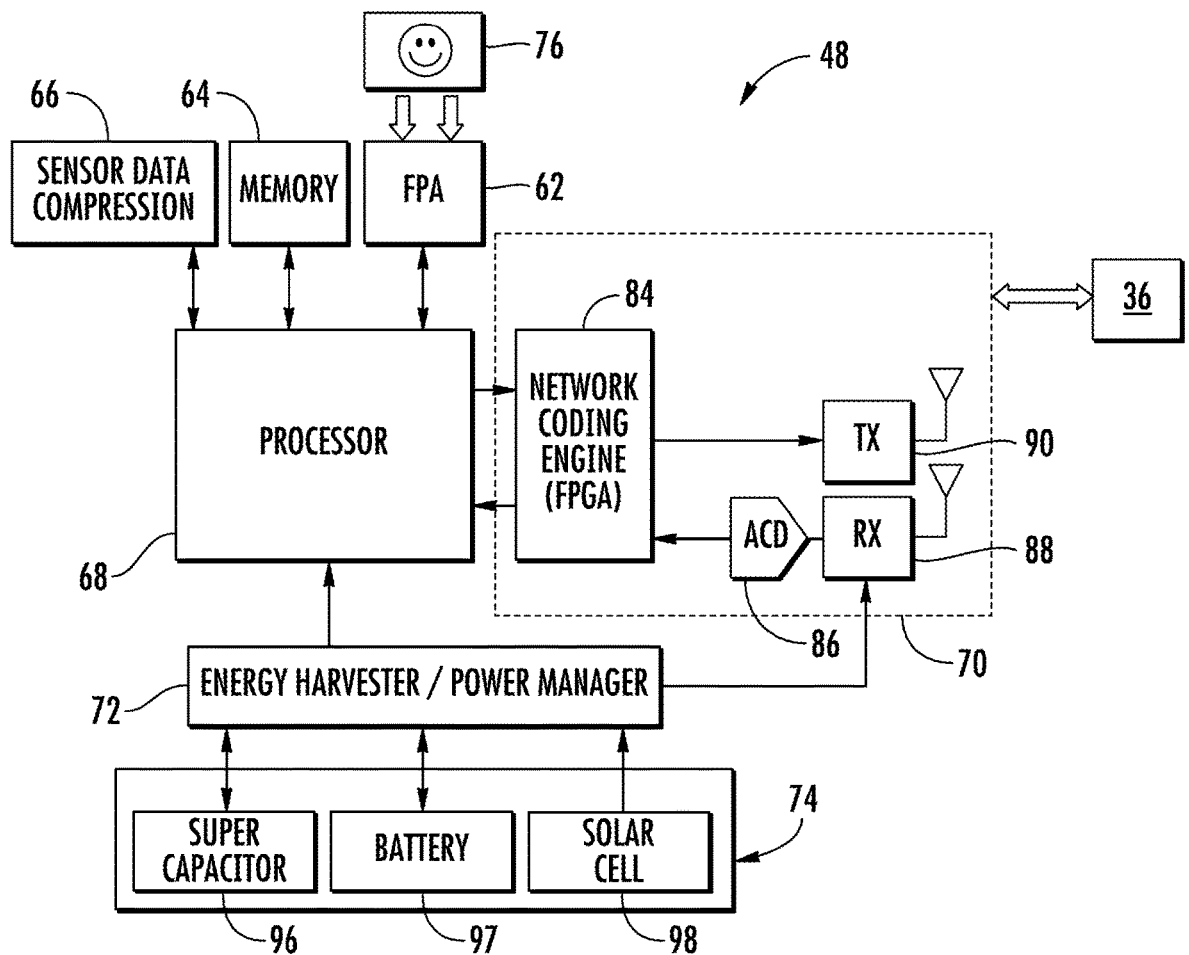
FIG. 3 is a schematic of an infrared detector of the presence detection system.
Figure 4:
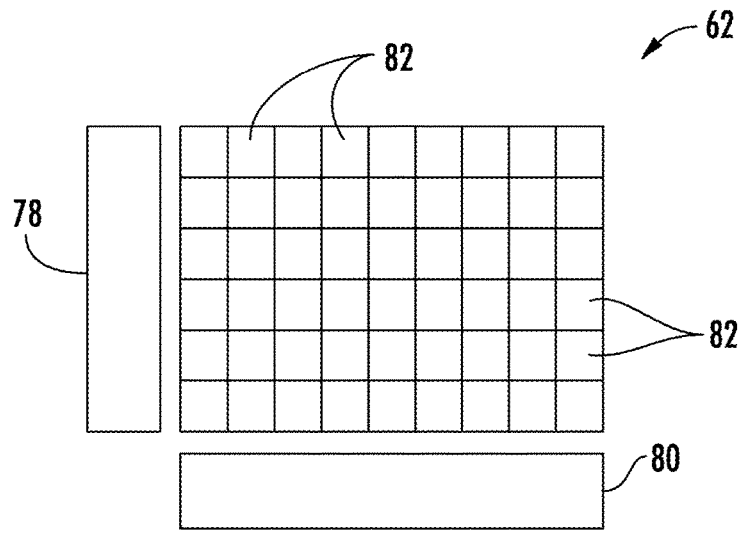
FIG. 4 is a plan view of a focal plane array of the infrared detector.

Referring to FIGS. 3 and 4, the infrared detector 48 may include a pyroelectric focal plane array (FPA) 62, a memory module 64, a sensor data compression block 66, a processor 68, a communication module 70, a power management module 72, and a power source 74.

The pyroelectric FPA 62 may be an infrared FPA configured to sense and detect radiated heat emitted by the presence. The FPA 62 may include a row decoder 78, a column decoder 80 (which are part of a Read-Out Integrated Circuit (ROIC)), and a plurality of pixels or sensors 82 that may be infrared sensors arranged in a series of rows and columns (i.e., six rows and nine columns illustrated in FIG. 4). The row and column decoders 78, 80 are electrically coupled to the respective rows and columns of the sensors 82, and are configured to receive intensity information (e.g., heat intensity) recorded over a time interval. As one example, the sensors 82 may be configured to sense radiated energy having an infrared, long wavelength that may be within a range of about seven and a half (7.5) to fifteen (15) micrometers. This range is a thermal imaging region, in which the sensors 82 may obtain a passive image of the presence (e.g., of numerous humans) that is in whole or in part at only a slightly higher temperature than, for example, ambient floor, wall, furniture, or ceiling temperature in a room. This image may be based on thermal emissions only and may require no visible illumination.

The memory module 64 of the infrared detector 48 is generally a computer readable and writeable storage medium and is configured to communicate with the processor 68 and generally stores intensity data from the sensors 82 for later processing, stores executable programs (e.g., algorithms) and their associated permanent data as well as intermediate data from their computation. The memory module 64 may be a random-access memory (RAM) that may be a ferroelectric RAM (FRAM) having relatively low power consumption with relatively fast write performance, and a high number of write-erase cycles. It is further contemplated and understood that the memory module 64 may be integrated, in-part, with the controller 52 and/or computing device 36 that may also perform, at least in-part, a portion of the data processing of data received from the FPA 62.

The radiant energy intensity information/data received by the decoders 78, 80 may be conditioned via a signal conditioning circuit (not shown) and then sent to the processor 68. The signal conditioning circuit may be part of the ROTC. Signal conditioning may include analog-to-digital converters and other circuitry to compensate for noise that may be introduced by the sensors 82. The processor 68 may be configured to provide radiometric correction as well as interpolation of the decoded pixels as is generally known in the art. The processor 68 is generally computer-based, and examples may include a post-processor, a microprocessor and/or a digital signal processor. It is further contemplated and understood that the processor 68 may be integrated, in-part, with the controller 52 and/or computing device 36 that may also perform, at least in-part, a portion of the data processing of data received from the FPA 62. This integration is generally called a system on a chip (SoC). The SoC is an integration of most or all of the components of a computing system onto a single substrate or carrier. The SoC may contain digital, analog, mixed-signal, and wireless communication functions and is typically low complexity, low cost, and physically smaller than the non-integrated equivalent system.

The sensor data compression block 66 of the infrared detector 48 is known to one having skill in the art and is generally optional with regard to the present disclosure.

The communication module 70 of the infrared detector 48 is configured to send and receive information and commands relative to the operation of the infrared detector. The communication module 70 may include a network coding engine block 84, an ADC 86, a receiver 88 (e.g. wireless), and a transmitter 90 (e.g., wireless). As is well-known in the art, the transmitter 90 and receiver 88 may be implemented as a transceiver or could be replaced by a well-known wired communication link (not shown). Also known in the art, the transmitter 90 may perform a digital to analog conversion (DAC) when the communication channel is inherently analog (e.g., wireless). The network coding engine block 84 is configured to interface the input and output of the processor 68 to transmitter 90, receiver 88 (through ADC 86), provide encoding (e.g., for error detection and correction), security via encryption or authentication, and other features.

The ADC 86 of the infrared detector 48 is configured to convert received analog information to digital information for eventual use by the processor 68. The network coding engine 84 provides any decoding necessary to, for example, facilitate error detection and correction, and/or for security (e.g., for encryption, decryption, or authentication).

The receiver 88 and the transmitter 90 of the infrared detector 48 are configured to respectively receive and transmit communications to and from other systems or components such as the controller 52 of the presence detection system 42 and/or the computing device 36 of the building management system 20. Such communications may be conducted over pathways that may be wired or wireless.

The power management module 72 of the infrared detector 48 is configured to control the power acquisition and power consumption of the infrared detector by controlling both the power source 74 and power consuming components. Such power consuming components may include the processor 68, the optional data compression block 66, the memory 64, the FPA 62 and the communication module 70 (e.g., transmitter 90, receiver 88, and ADC 86). It is contemplated and understood that other energy consuming components of the infrared detector 48 may be controlled. Such control may simultaneously maintain the infrared detector functionality while maximizing life (i.e., the length of time the infrared detector 48 can remain functional). In one embodiment, this control is achieved by receding horizon control (optimization). In alternative embodiments other control strategies such as model predictive control may be used. In one embodiment, the power consumption of the processor 68 and the memory 64 may be controlled by the power management module 72 by reducing the clock rate. It is further contemplated and understood that the power management module 72 and/or the power source 74 may provide power to the radar detector 50.

The power source 74 of the infrared detector 48 provides power to the other components of the detector, and may include at least one of a super capacitor 96, a battery 97 and a solar cell 98. The power management module 72 is configured to draw power from any one of the power sources as dictated by the needs of the system. The power management module 72 may also facilitate a power scheduling function that controls the simultaneous use of the various component functions to minimize unwanted current spikes. It is contemplated and understood that other short-term energy storage devices may be used in place of the super capacitor 96, other long-term energy storage devices may be used in place of the battery 97, and other energy harvesting or recharging devices may be used in place of the solar cell 98 including power from a power grid.

Figure 5:
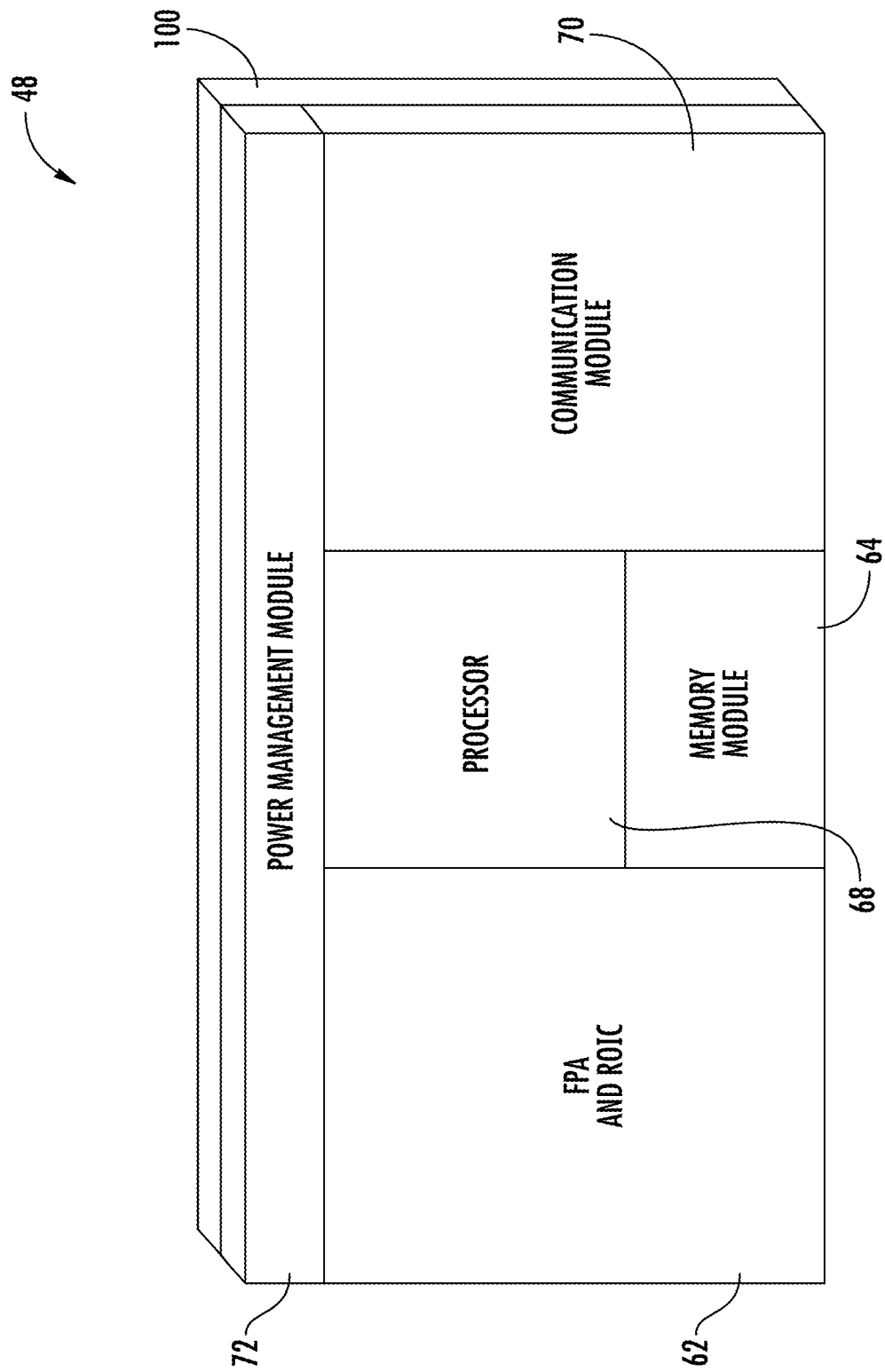
FIG. 5 is a perspective view of components of the infrared detector integrated into a common substrate platform.

Referring to FIG. 5, the FPA 62 (including the ROIC), the memory module 64, the processor 68, the power management module 72 and the communication module 70 may generally be integrated together on a single substrate platform or chip 100 that may be silicon-based. More specifically, the components may generally share the focal plane of the FPA 62. Together, the integrated components may be aimed toward minimal power consumption, small overall size/weight, low complexity, and/or low cost. Integration of these components may be further enhanced via a power scheduling function conducted by the power management module 72 as well as coordinated design of the individual functions of each component to work harmoniously. That is, the power scheduling function may, for example, minimize unwanted current spikes by controlling the simultaneous use of the various on-chip components functions.

By placing individual subsystem components on the same die or substrate platform 100, signal integrity, resistive losses, and security is generally improved through elimination of interconnects and sources of extraneous electrical and radiative noise typically present in systems with similar functionality but that use several individually packaged integrated circuits (IC's). Moreover, by placing all components on the same substrate platform 100, economy of scale is achieved that enables chip-scale cost reduction. Yet further, power management and consumption may be optimized potentially achieving long life battery operation, and facilitating packaging of various circuitry components on a single substrate platform 100. The infrared detector 48 may be built upon a ferroelectric memory platform using either active or passive detection; and, may be built upon a thermal isolator rather than a MEMS bridge, thereby improving yield, reducing across device response variations, and may be compatible with wafer production having small feature sizes.

By placing the individual subsystem components on the same die or substrate, it is also possible to control the number of pixels 82 being interrogated at any given time. This versatility in utilizing focal plane array 62 active pixel count is another means of power management.

Tracking algorithms may be used and executed by the processor 68 to estimate the number of occupants and track their movements within an established field of view of the infrared detector 48. The pyroelectric materials used in making the sensors 82 of the FPA 62 may only respond to moving objects, thus minimizing or eliminating signals resulting from background clutter. Motion detectors constructed from the ferroelectric class of materials are referred to as pyroelectrics. They have a volume polarization due to the nature of their crystal structure, which is non-centrosymetric. When operated significantly below their Curie point and previously poled, the net polarization varies approximately linearly with the temperature of the device. Thus, these materials can be metalized to form a capacitor structure. Upon temperature change of the device (i.e., either through deliberate heating or exposed to the radiant heat of a person, etc), the polarization changes and charge (Q) is either deposited or removed from the metal surfaces comprising the electrodes of the capacitor; whereupon a voltage (V) may appear across the capacitor (C), such that:

$$V=Q/C$$

This voltage is slowly bled off due to the small but finite internal conductivity of the pyroelectric. Thus pyroelectric imagers respond best to transitory heating and cooling, and therefore respond when a person enters, moves within, or leaves an imaged scene. Occupants that are initialized within the field of view and establish trackable motion within the array may be tracked and counted. Targets that are initialized in one of the sensors 82 and that do not establish movement within the array 62 will not be tracked by the algorithm, but may still be interrogated (i.e., measured) by the radar detector 50 of the presence detection system 42.

Figure 6:
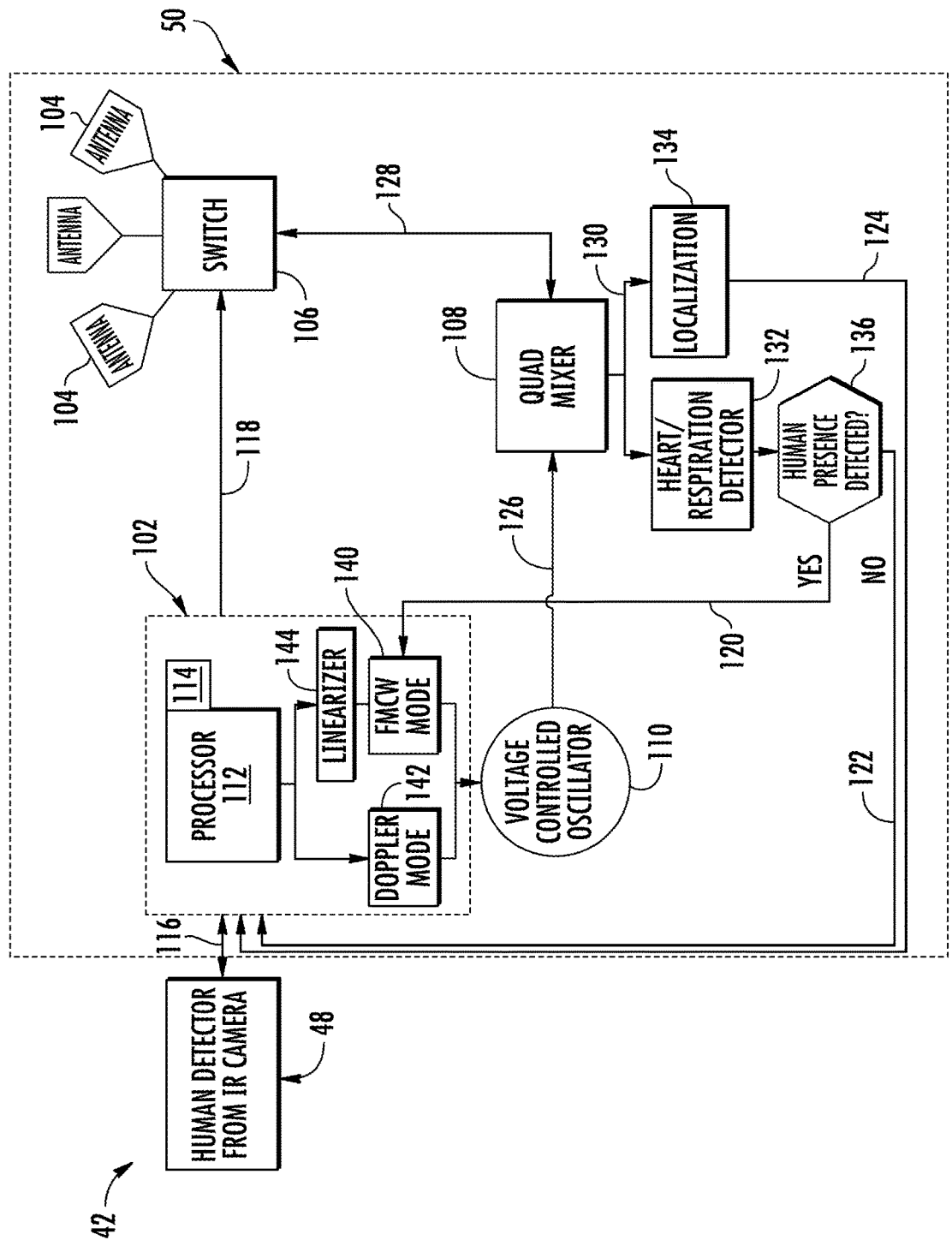
FIG. 6 is a schematic of the presence detection system.

Referring to FIG. 6, the radar detector 50 of the presence detection system 42 may include a controller 102, a plurality of antennas 104 (three illustrated), a switching module 106, a quadrature mixer 108, and an oscillator 110. The controller 102 may include a computer-based processor 112 and a computer readable and writeable storage medium 114. The controller 102 may be configured to: send and receive signals (see arrow 116) to and from the infrared detector 48; send command signals (see arrow 118) to the switching module 106; and receive affirmative, negative and localization signals (see respective arrows 120, 122, 124) generally from the quadrature mixer 108. It is further contemplated and understood that the controller 102 may be, at least in-part, part of the controller 52 of the infrared detector 48, and/or at least in-part, part of the computing device 36.

The storage medium 114 of the presence detection system 42 may be part of the memory module 64 and/or is generally a computer readable and writeable storage medium configured to communicate with the processor 112, and generally stores data from the infrared and radar detector 48, 50 for later processing, stores executable programs (e.g., algorithms) and their associated permanent data as well as intermediate data from their computation. The storage medium 114 may be a random-access memory (RAM) that may be a ferroelectric RAM (FRAM) having relatively low power consumption with relatively fast write performance, and a high number of write-erase cycles. It is further contemplated and understood that the storage medium 114 may be integrated, at least in-part, with the controller 52 and/or computing device 36 that may also perform, at least in-part, a portion of the data processing of data received from the radar detector 50.

The quadrature mixer 108 of the radar detector 50 is configured to: receive an input signal (see arrow 126) from the oscillator 110, which may be a voltage controlled oscillator; communicate with the switching module 106 via communication signals (see arrow 128, and provide downmixed signals (see arrows 130) to heartbeat/respiration detector 132 and localization module 134. Heartbeat/respiration detector 132 performs feature extraction on down mixed signals 130 to more readily distinguish vital signs in down mixed signals 130 from clutter and noise. Human presence module 136 uses the features from heartbeat/respiration detector 132 to determine if a human is present and outputs this determination to controller 102 via signal 122 if not, and to FMCW mode module 140 via signal 120 if so. The features produced by heartbeat/respiration detector 132 may include a frequency, an amplitude, a phase, a correlation, and/or the output of a filter. Localization module 134 also uses down mixed signals 130 to localize, particularly in range, the presence of possible humans in space 34 and outputs this localization to controller 102 via signal 124. More generally, the quadrature mixer 108 together with heartbeat/respiration detector 132, localization module 134, and human presence module 136 are generally configured to process data generated by the antennas 104 into two categories with the first category being relative to vital signs of the occupant(s) and the second category relative to a location of the occupant in the space 34.

The controller 102 of the radar detector 50 may be configured to selectively operate in a Doppler mode (see Doppler mode module 142 in FIG. 6) and a Frequency Modulated Continuous Wave (FMCW) mode (see FMCW mode module 140) based on the situation. The Doppler mode module 142 may be used for situations where only one or two targets are in motion (as determined, for instance, by the IR camera), and the FMCW mode module 140 may be used to separate targets in space to assist algorithms in selectively rejecting signals from targets. A linearizer 144 of the controller 102 operates to remove the non-linear frequency components associated with the FMCW radar, creating an easier to process, linear frequency sweep. If a human presence is detected and confirmed by the quadrature mixer 108 through vital signs (e.g., respiration and/or heartbeat), the resulting affirmative signal 120 may be generally applied or sent to the FMCW mode module 140. If no human presence is confirmed by the quadrature mixer 108, the resulting negative signal 122 is utilized by the controller 102 to enter into search state whereby the IR camera 116 is used in conjunction with the Doppler mode and its signal swept throughout a volume by selectively actuating switch 106 to sweep through antennas 10A. The IR camera 116 and Doppler mode 142 can operate simultaneously to identify both IR signatures and motion, either of which can be used to trigger algorithms that will look for the shape, motion profile, or vital signatures of a human. By using radar to verify human vital signs, false alarms associated with the IR camera's detection of warm objects can be rejected.

Each one of the plurality of antennas 104 may be positioned to monitor a pre-selected location within the space 34. The switching module 106 may be configured to energize a selected one of the plurality of antennas 104 when the infrared detector 48 detects an occupant in a location associated with the antenna 104 to be energized. Alternatively, the switching module 106 may be configured to steer one or more antennas toward any one of a plurality of locations, thus tracking the occupant when first detected by, for example, the infrared detector 48. It is contemplated that the steering may be entirely electrical (e.g., phased array beam-steering), may be entirely mechanical steering by physically moving the antenna, may be by selecting one of several antennas pointed in different directions, or may be a combination of electrical, selecting, and mechanical steering. It is further contemplated and understood that the plurality of antennas 104 may be an array.

The controller 102 may further provide a platform upon which sensor fusion algorithms may be deployed. The fusion of multiple modes of human presence detection (i.e., from radiant energy detector 48 and from radar detector 50), will provide better human presence detection that has a lower missed detection rate and/or a lower false alarm rate. This fusion may be achieved by controller 102 through the sequential use of the radiant energy detector 48 and the radar detector 50, which may be in any order, where the first to be used performs an initial detection and the second to be used provides a confirmation. In an alternate embodiment controller 102 fuses the output of the radiant energy detector 48 and the radar detector 50 simultaneously in a joint estimation of human presence. The joint estimation may be performed by Bayesian Estimation using probability density functions (pdfs) of the output of the radiant energy detector 48 and the radar detector 50. In alternative embodiments, alternative linear or non-linear joint estimation techniques may be employed such as maximum likelihood (ML), maximum a priori (MAP), non-linear least squares (NNLS), and others.

The various components, detectors and modules including the quad mixer 108, the oscillator 110, the heartbeat/respiration detector 132, the localization module 134, the human presence module 136, the FMCW mode module 140, the Doppler mode module 142, the linearizer 144, and others may be, at least in-part, software-based and generally executed by, for example, the processor 112 with source codes and relevant data being writeable and readable from, for example, the storage medium 114.

Figure 7:
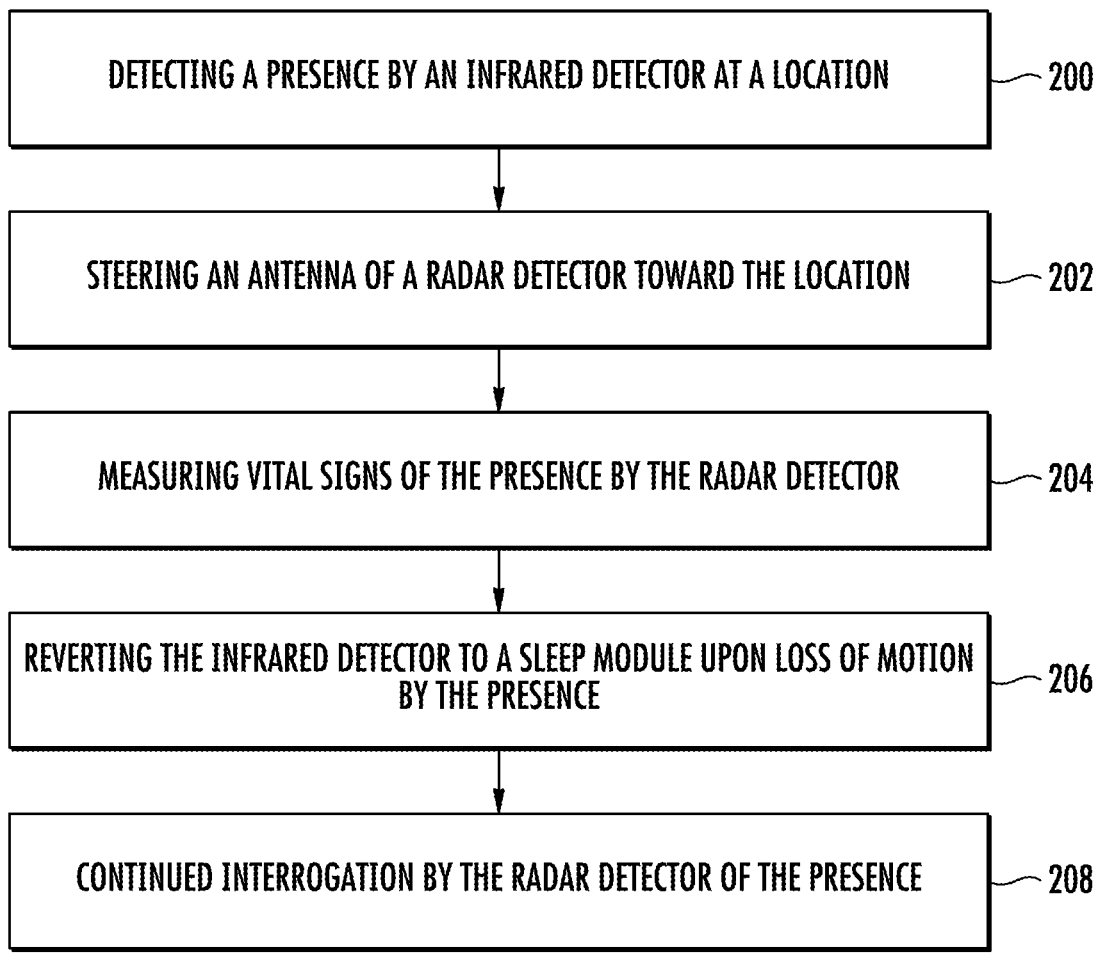
FIG. 7 is a flow chart of a method of operating the presence detection system.

In operation and referring to FIG. 7, the presence detection system 42 may as block 200, detect a presence by the infrared detector 48 at a location in the space 34 that may be moving. As block 202, an antenna 104 of the radar detection 50 may be steered or selected by the switching module 106 based and associated with the detected location of the presence. More specifically, the controller 102 may receive a signal from the infrared detector 48 indicative of the presence and the presence location and outputs an associated signal to the switching module 106 for further interrogation of the presence. As block 204, the radar detector 50 may measure the vital-signs of the presence thereby verifying a human presence. As block 206, the presence detection system 42 may place the infrared detector in a sleep mode for saving energy after initial detection of the presence and initialization of the radar detector 50. In other instances, the infrared detector may remain active for joint estimation of a presence. If the infrared detector is placed in sleep mode, it may be re-awoken when someone leaves the room and/or the radar loses track, or other events. As block 208, and with (for example), the infrared detector 48 in the sleep mode, the radar detector 50 continues to interrogate the presence whether or not the presence is moving, whether or not the presence is behind an object in the space 34, and whether or not the presence is beyond a detectable distance of the infrared detector 48 (i.e., greater than about ten meters away depending on the contrast temperature, detector sensitivity, noise equivalent power, emissivity, reflectivity, target size, occlusion, optical design, and others).

Benefits of the present disclosure include a low complexity, low cost infrared detector 48 (i.e., a FPA of few sensors), a device that utilizes little energy since the sensors are only activated by the detection circuit when an occupant moves within the device's field of view, and a simplified tracking and counting algorithm that provides high accuracy and limits false alarms.

Other benefits include the ability to confirm a human presence based on vital-signs over a long range (i.e., about ten meters or more), a relaxation of individual requirements on the infrared and radar detectors while creating additional functionality through the combination of both sensing domains, a system capable of functioning with either the infrared or the radar detectors as detection requirements change and also to adapt to power requirements, and the enablement of future applications relative to building management systems including target classification, counting, and intent detection. The system is additionally robust to electromagnetic interference, vibration, and other sources of nuisance alarms.

While the present disclosure is described with reference to exemplary embodiments, it will be understood by those skilled in the art that various changes may be made and equivalents may be substituted without departing from the scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A presence detection system comprising:
an infrared detector;
a radar detector; and
a computer processor configured to receive respective signals from the infrared and radar detectors and process the signals via execution of an algorithm, wherein the radar detector includes at least one antenna and a switching module configured to steer the at least one antenna for presence detection, and wherein the radar detector is configured to perform one of an initial presence detection and a presence confirmation, and the infrared detector is configured to perform the other of the initial presence detection and the presence confirmation.

2. The presence detection system set forth in claim 1, wherein the algorithm is a sensor fusion algorithm configured to fuse the respective signals simultaneously.

3. The presence detection system set forth in claim 1, wherein the infrared detector includes a focal plane array including a plurality of radiant energy sensors configured to convert radiant energy into an electrical signal.

4. The presence detection system set forth in claim 1, wherein the radar detector includes a quadrature mixer module configured to communicate with the switching module and the computer processor and output a down-mixed signal, a heartbeat/respiration detector configured to receive the down-mixed signal to distinguish vital signs of a detected presence, and a localization module configured to receive the down-mixed signal to localize the detected presence.

5. The presence detection system set forth in claim 4, wherein the radar detector includes a human presence module configured to receive an output signal from the heartbeat/respiration detector to determine if the detected presence is human.

6. The presence detection system set forth in claim 5, wherein the human presence module is configured to output an affirmative signal to a FMCW mode module of a controller that includes the computer processor, and wherein the FMCW mode module is configured to separate multiple detected presence in space to assist execution of the algorithm by the computer processor to selectively reject presence detections.

7. The presence detection system set forth in claim 6, wherein the human presence module is configured to output a negative signal to the controller if a human presence is not detected.

8. The presence detection system set forth in claim 1, wherein the infrared detector is configured to operate in a sleep mode upon the absence of motion.

9. The presence detection system set forth in claim 1, wherein the radar detector is configured to measure vital signs of a presence.

10. The presence detection system set forth in claim 9, wherein the vital signs include at least one of heartbeat and respiration.

11. A presence detection system comprising:
an infrared detector;
a radar detector; and
a computer processor configured to receive respective signals from the infrared and radar detectors and process the signals via execution of an algorithm, wherein the radar detector is configured to perform one of an initial presence detection and a presence confirmation, and the infrared detector is configured to perform the other of the initial presence detection and the presence confirmation.

\* \* \* \* \*